United States Patent
Alexander et al.

(10) Patent No.: US 10,979,876 B2
(45) Date of Patent: Apr. 13, 2021

(54) METHOD FOR ESTIMATING THE POSITION OF AN OBJECT

(71) Applicant: Cohda Wireless Pty Ltd., Wayville (AU)

(72) Inventors: Paul Dean Alexander, Wayville (AU); Malik Khan, Wayville (AU); John Lawrence Buetefuer, Wayville (AU); Mohamed Elbanhawi, Wayville (AU); Kukulage Nomal Samunda Perera, Wayville (AU); Lachlan Travis Robinson, Wayville (AU)

(73) Assignee: Cohda Wireless Pty Ltd.

( * ) Notice: Subject to any disclaimer, the term of this patent is extended or adjusted under 35 U.S.C. 154(b) by 0 days.

(21) Appl. No.: 16/557,554

(22) Filed: Aug. 30, 2019

(65) Prior Publication Data

US 2020/0077238 A1    Mar. 5, 2020

(30) Foreign Application Priority Data

Aug. 31, 2018 (AU) ................. 2018903227

(51) Int. Cl.
   *H04W 4/00* (2018.01)
   *H04W 4/40* (2018.01)
   (Continued)

(52) U.S. Cl.
   CPC ............. *H04W 4/40* (2018.02); *H04W 4/029* (2018.02); *H04W 4/38* (2018.02);
   (Continued)

(58) Field of Classification Search
   CPC ..... H04W 4/023; H04W 4/026; H04W 4/027; H04W 4/40; H04W 4/44; H04W 4/80;
   (Continued)

(56) References Cited

U.S. PATENT DOCUMENTS

| 2002/0171586 A1 | 11/2002 | Martorana et al. |
| 2008/0143603 A1 | 6/2008 | Bornholdt |

(Continued)

FOREIGN PATENT DOCUMENTS

| WO | WO-2018074958 A1 | 4/2018 |
| WO | WO-2018106467 A1 | 6/2018 |

OTHER PUBLICATIONS

"Australian Application No. 2018903227, International-type search for provisional patent application dated Jun. 7, 2019", (Jun. 7, 2019), 21 pgs.

(Continued)

*Primary Examiner* — Joseph Arevalo
(74) *Attorney, Agent, or Firm* — Schwegman Lundberg & Woessner, P.A.

(57) ABSTRACT

Methods and systems for estimating the position of an object such (as a vehicle) are disclosed. The method comprises transmitting a first V2X message from the object to a plurality of spaced apart units; and receiving a set of V2X response messages from at least two units in response to the first V2X message. Each response message comprises an identifier of the object, an identifier of the unit from which the response message was sent, and temporal information associated with the times of receiving a previous V2X message at the unit and transmitting a previous V2X response message from the unit. The position of the object is estimated based on the information contained in the set of V2X response messages and the times of transmitting the previous V2X message from the object and receiving the previous set of V2X response messages at the object.

18 Claims, 9 Drawing Sheets

(51) Int. Cl.
*H04W 4/029* (2018.01)
*H04W 84/00* (2009.01)
*H04W 12/10* (2021.01)
*H04W 64/00* (2009.01)
*H04W 60/04* (2009.01)
*H04W 4/38* (2018.01)

(52) U.S. Cl.
CPC ....... *H04W 12/1008* (2019.01); *H04W 60/04* (2013.01); *H04W 64/003* (2013.01); *H04W 84/005* (2013.01)

(58) Field of Classification Search
CPC ......... H04W 72/0486; H04W 72/0493; H04W 74/08; H04W 74/0808; H04W 74/0816; H04W 74/0833
USPC ........................... 455/456.1, 452.1, 297, 410
See application file for complete search history.

(56) References Cited

U.S. PATENT DOCUMENTS

| | | | |
|---|---|---|---|
| 2012/0182935 A1 | 7/2012 | Addepalli et al. | |
| 2012/0309415 A1 | 12/2012 | Rhoads | |
| 2014/0195102 A1 | 7/2014 | Nathanson | |
| 2015/0247730 A1* | 9/2015 | Calmettes | B64G 1/007 701/468 |
| 2015/0331099 A1* | 11/2015 | Wu | G08G 5/0008 342/32 |
| 2016/0195600 A1 | 7/2016 | Feldman et al. | |
| 2016/0277196 A1 | 9/2016 | Jose et al. | |
| 2016/0285935 A1* | 9/2016 | Wu | H04W 4/90 |
| 2017/0215119 A1* | 7/2017 | Hong | H04W 36/08 |
| 2017/0230940 A1* | 8/2017 | Jung | H04W 76/14 |
| 2018/0139593 A1* | 5/2018 | Chun | H04W 4/12 |
| 2018/0299273 A1* | 10/2018 | Cai | G01C 21/30 |
| 2018/0332585 A1* | 11/2018 | Faurie | H04W 72/1205 |
| 2019/0028897 A1* | 1/2019 | Ying | H04L 67/12 |
| 2019/0045034 A1* | 2/2019 | Alam | H04L 12/5692 |
| 2019/0075548 A1* | 3/2019 | Lee | H04W 72/02 |
| 2019/0221110 A1* | 7/2019 | Vanderveen | G01S 13/74 |
| 2020/0018816 A1 | 1/2020 | Alexander et al. | |

OTHER PUBLICATIONS

"European Application No. 19194672.2, Extended European Search Report dated Jan. 16, 2020", (Jan. 16, 2020), 9 pgs.

"European Application Serial No. 19185826.5, European Search Report dated Oct. 30, 2019", 11 pgs.

Nam, Wooseok, et al., "Least-Squares-Based Iterative Multipath Super-Resolution Technique", IEEE Transactions on Signal Processing, 61(3), (2013), 519-529.

Venkatesh, S., et al., "Non-line-of-sight identification in ultra-wideband systems based on received signal statistics", IET Microwaves Antennas & Propagation, 1(6), (Jan. 2008), 1120-1130.

"European Application No. 19194672,2, Office Action dated Nov. 25, 2020", 9 pgs.

* cited by examiner

Figure 7

METHOD FOR ESTIMATING THE POSITION OF AN OBJECT

CROSS-REFERENCE TO RELATED APPLICATIONS

The present application claims priority to Australia Provisional Application No. AU2018903227 entitled "A method for estimating the position of an object," filed on 31 Aug. 2018, and which is incorporated by reference herein in its entirety.

The present application also relates to U.S. patent application Ser. No. 16/510,819 entitled "A method and system for estimating range between and position of objects using a wireless communication system" filed on 12 Jul. 2019, the contents of which are hereby incorporated by reference in their entirety.

TECHNICAL FIELD

Aspects of the present disclosure relate to methods and systems for estimating the position of an object, and in particular a vehicle.

BACKGROUND

An accurate position of an object such as a vehicle is required in many applications. Global Navigation Satellite System (GNSS) is an example of a positioning system which uses geostationary satellites to determine the position of an object at any given time. The GNSS positioning system suffers from multi-path extensions caused by urban canyons. Multi-path extensions are the multiple paths taken by GNSS signals as they bounce off buildings and other infrastructural elements. In addition, GNSS based systems do not work in undercover scenarios, for example in underground car parks, homes, tunnels, and any other compromised sky view. This is because objects located in undercover scenarios may not be able to connect with enough satellites to calculate the object's position. The GNSS system is generally augmented with inertial sensors to provide a dead reckoning solution in these challenging scenarios. These augmentations, unless corrected, can accumulate errors over time and will lead to an increase in measurement errors. Therefore, in many cases the GNSS, even assisted by dead-reckoning sensors and atmospheric corrections, fail to provide accurate position estimation. Accurate position estimation may not be required in every scenario however it is critical in certain situations and applications, for example, in the case of autonomous vehicle systems. Accurate and continuous position estimation of such vehicles is absolutely crucial to ensure the safety of these systems.

Reference to any prior art in the specification is not an acknowledgment or suggestion that this prior art forms part of the common general knowledge in any jurisdiction or that this prior art could reasonably be expected to be combined with any other prior art by a skilled person in the art.

SUMMARY

According to a first aspect of the invention, there is provided a method for estimating the position of an object, the method comprising: transmitting a first V2X message from the object to a plurality of spaced apart units; receiving a set of V2X response messages from at least two units in response to the first V2X message, wherein each response message comprises an identifier of the object, an identifier of the unit from which the response message was sent, and temporal information associated with the times of receiving a previous V2X message at the unit and transmitting a previous V2X response message from the unit; and estimating the position of the object based on the information contained in the set of V2X response messages and the times of transmitting the previous V2X message from the object and receiving the previous set of V2X response messages at the object.

In an embodiment, prior to transmitting the first V2X message, at least some of the plurality of units located within the object's reception range register with the object.

In an embodiment, the object receives a service message from each of the plurality of units as part of registration process.

In an embodiment, the service message comprises a unique unit identifier and at least one of positional information and characteristic response time delay of the unit.

In an embodiment, the registration process further includes verifying authenticity of the unique unit identifier in the service message based on valid certificates.

In an embodiment, the service message is a locate service announcement message.

In an embodiment, the locate service announcement message is 12 bytes in length.

In an embodiment, the service message further comprises road specific information including information related to road angles in the vicinity of the unit to improve the position estimation of the object.

In an embodiment, the object is a stationary or moving vehicle fitted with an On Board Unit (OBU), and the units are Road Side Units (RSU) whose position co-ordinates are precisely known at any given time.

In an embodiment, a response V2X message comprises a control header portion, a unit identifier portion such as an address, and two time stamps.

In an embodiment, the control header portion is 2 bytes long, the unit identifier portion is 6 bytes long, and each of the two time stamps is 8 bytes long.

In an embodiment, the set of response V2X messages are broadcasted/multi-casted as a single data packet.

In an embodiment, the data packet has a maximum size of 2304 Bytes and it can support 84 response V2X messages along with a valid certificate of 288 Bytes.

In an embodiment, the method further comprises estimating clock offset and drifts occurring between the clock of the object and the clocks of the units for accurately estimating the position of the object.

In an embodiment, the method is performed using either IEEE 802.11p (Wi-Fi v2x technology) standard or LTE-V2X/C-V2X (cellular v2x technology) standard.

In an embodiment, the object further receives the object's position information from GNSS positioning system and combines it with the position estimation obtained using the set of response V2X messages, for more accurately estimating the position of the object.

In an embodiment, estimating the position of the object is further based on the positional information of the corresponding unit.

According to a second aspect of the invention, there is provided a system for estimating the position of an object, the system comprising: a communication device, connected to the object, for: transmitting a first V2X message from the object to a plurality of spaced apart units; and receiving a set of V2X response messages from at least two units in response to the first V2X message, wherein each response message comprises an identifier of the object, an identifier of the unit from which the response message was sent, and temporal information associated with the times of receiving a previous V2X message at the unit and transmitting a previous V2X response message from the unit; a processor for processing the information contained in the set of V2X response messages, and the times of transmitting the previous V2X message from the object, and receiving the previous V2X response message at the object for estimating the position of the object.

BRIEF DESCRIPTION OF THE DRAWINGS

Embodiments of the present disclosure will now be described with reference to the drawings, in which.

DESCRIPTION OF EMBODIMENTS

Embodiments of the present disclosure relate to positioning methods and systems, particularly but not exclusively, to positioning methods and systems in connected vehicle environments. In a connected vehicle environment, vehicles can communicate with surrounding vehicles, objects, infrastructure elements, Road Side Units (RSU), pedestrians, and so on using communication messages. In the present disclosure, a processor is used to process the communication messages to determine the range measurement (i.e. distance) between a first object (whose position is to be determined; for example, a vehicle or a person) and a second object (whose accurate position is known, for example a Road Side Unit). The range measurement, along with the known position of the second object, can then be used to precisely obtain the position of the first object. The range measurements can either be used individually or in combination with additional information such as position estimation from the GNSS, actual heading data including yaw data, expected heading or direction of motion, speed, etc., of the first object to estimate the position of the first object.

Figure 1:
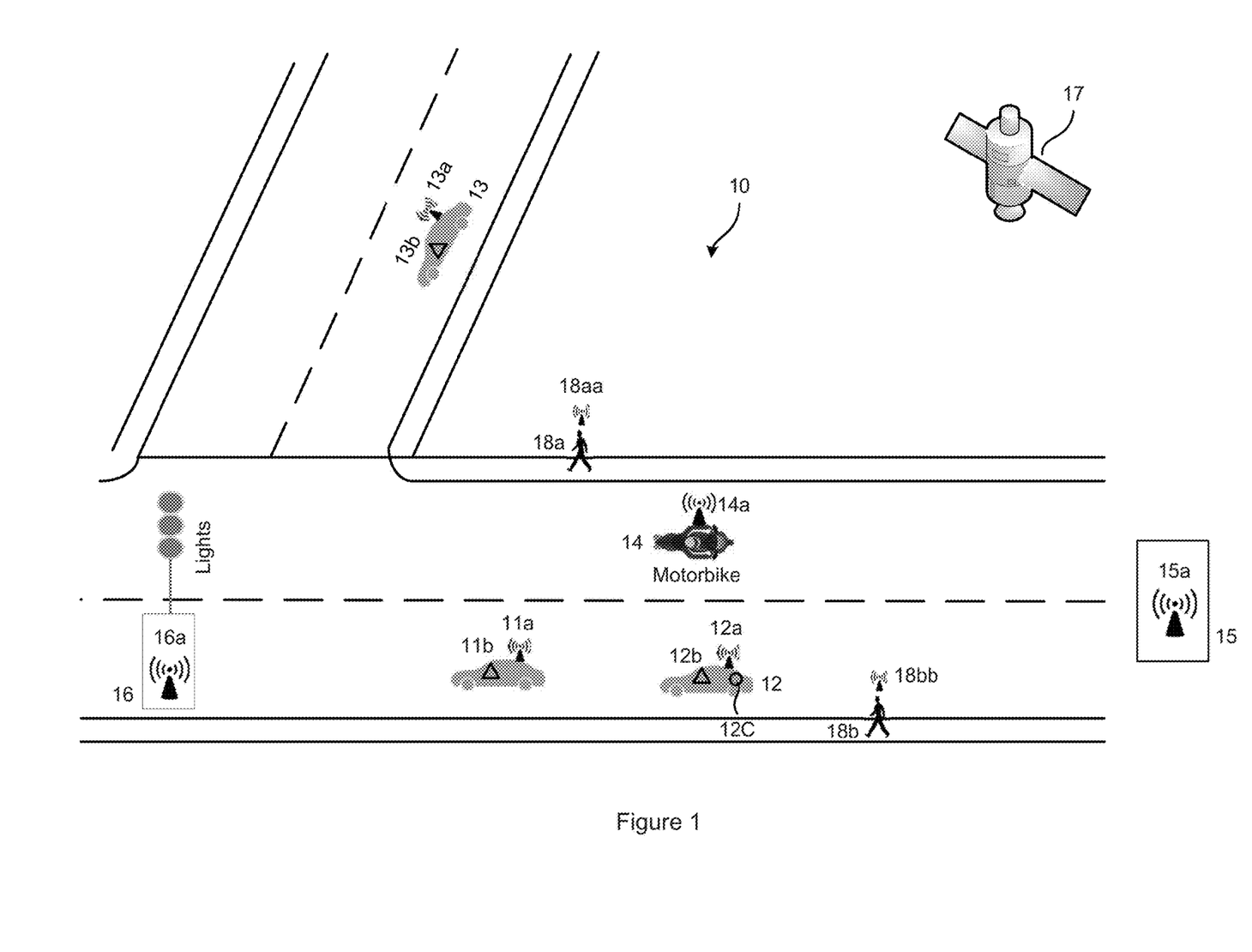
FIG. 1 illustrates an example environment where aspects of the present disclosure may be implemented.

FIG. 1 shows an exemplary system of a connected vehicle environment 10 in which embodiments of the present disclosure may be implemented for position estimation. The environment 10 includes various objects such as vehicles 11-14 (e.g. cars, motorcycles, bicycles and trucks etc.), infrastructure elements 15-16 (such as lamp posts, traffic signals and so on), pedestrians 18, GNSS satellites 17, and so on. Some of the objects 11-16, 18 may be equipped with a communication device (typically referred to as 11a-18a in FIG. 1) to communicate amongst each other.

In such a connected vehicle environment, typically vehicles are equipped with On-Board Units (OBUs), while infrastructure elements are supported by installation of RSUs. For example, each of the vehicles 11-14 may be equipped with an OBU 11a-14a, respectively, and the infrastructure elements 15, 16 may be equipped with RSUs 15a and 16a respectively. Pedestrians 18a and 18b may be equipped with their respective communication devices associated with their mobile phones 18aa and 18bb.

It is to be noted that the vehicles and pedestrians may be moving or stationary at any point in time, however the infrastructure elements are generally fixed in their location. There may also be one or more satellites 17 as components of a GNSS system.

Figure 2:
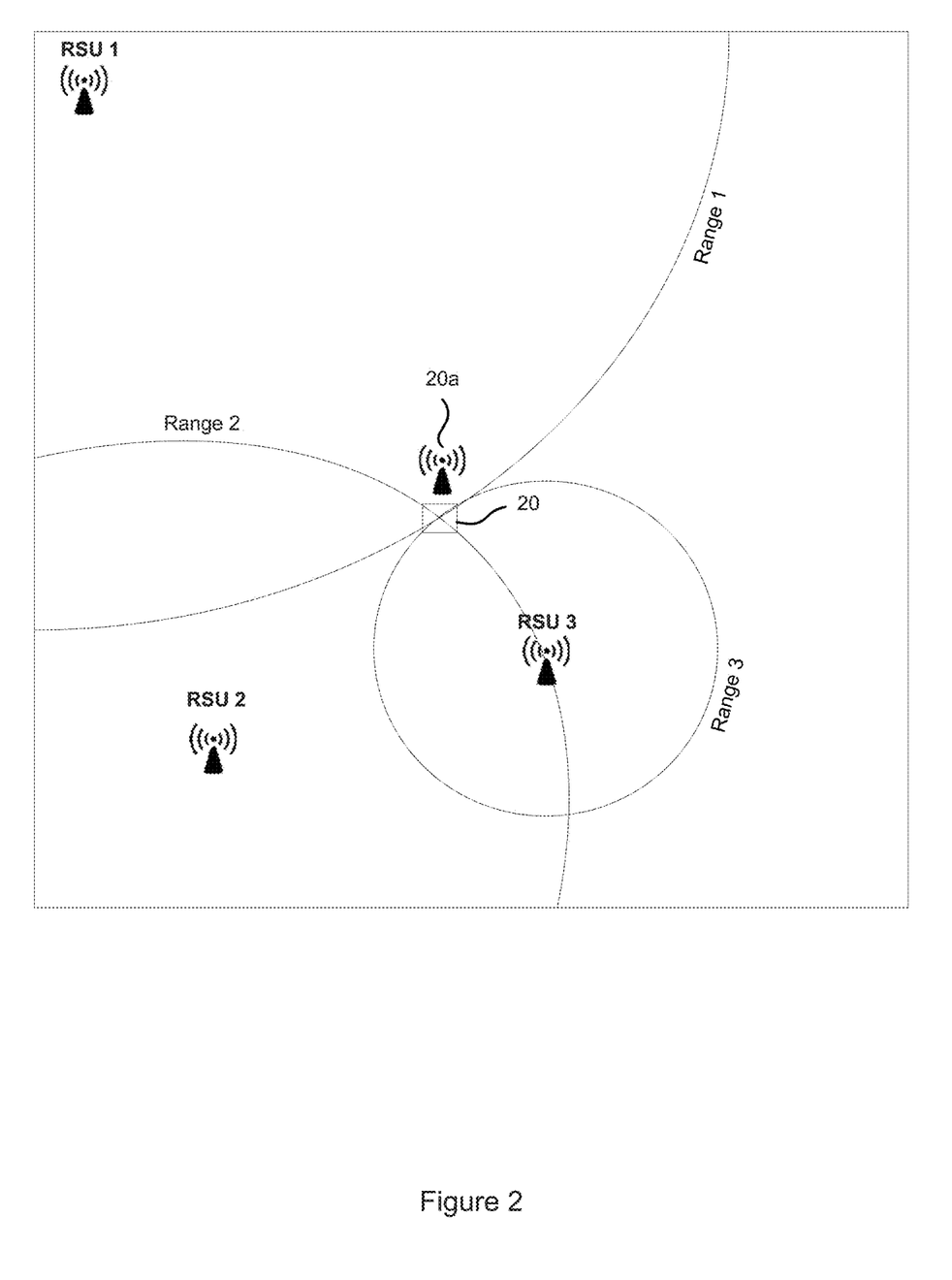
FIG. 2 illustrates an example of estimating position of a vehicle using V2X communication between the vehicle and multiple RSUs.
Figure 5:
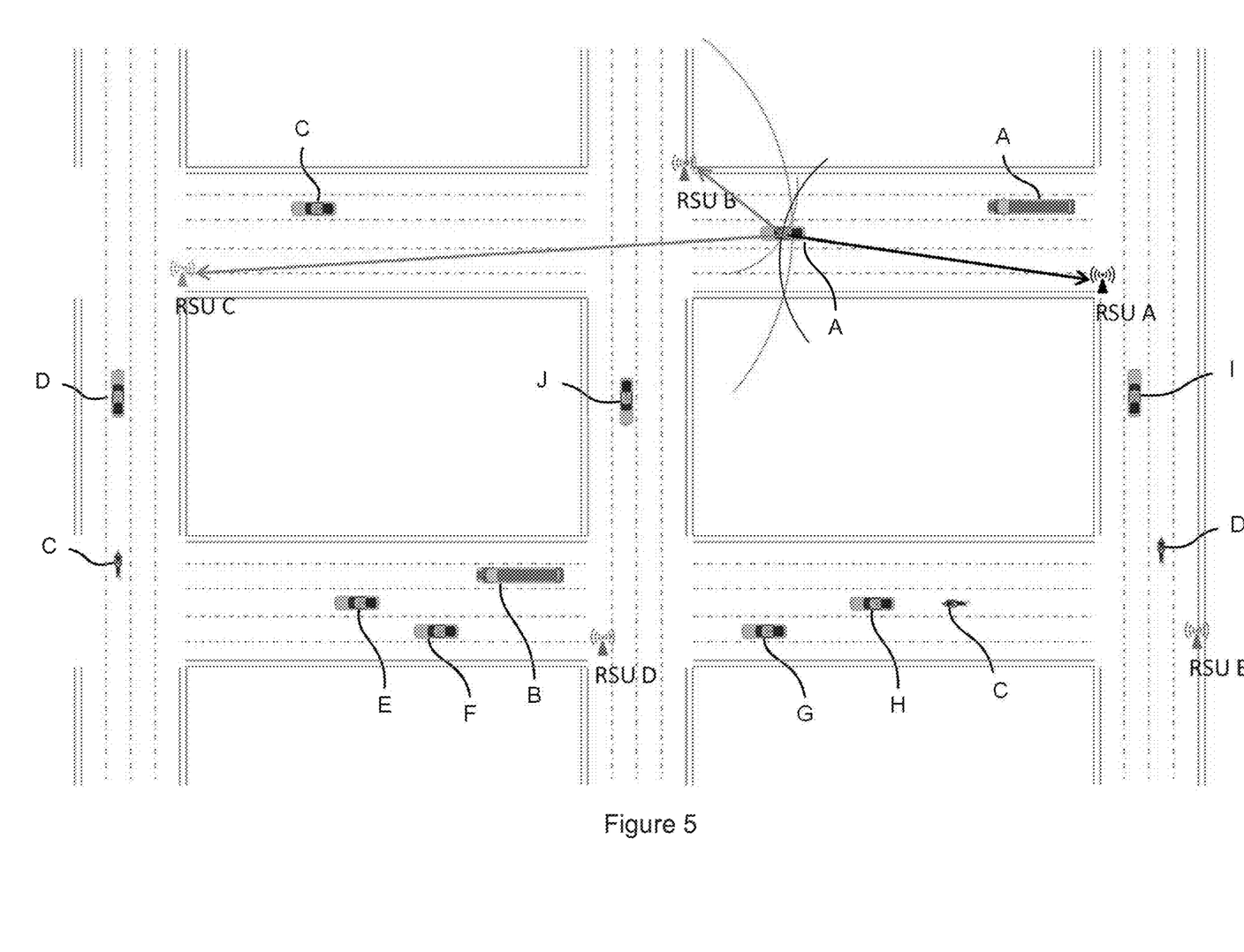
FIG. 5 and FIG. 6 show typical use of a V2X connected communication environment in an urban city layout for estimating position of a vehicle, in accordance with embodiments of the present disclosure.
Figure 6:
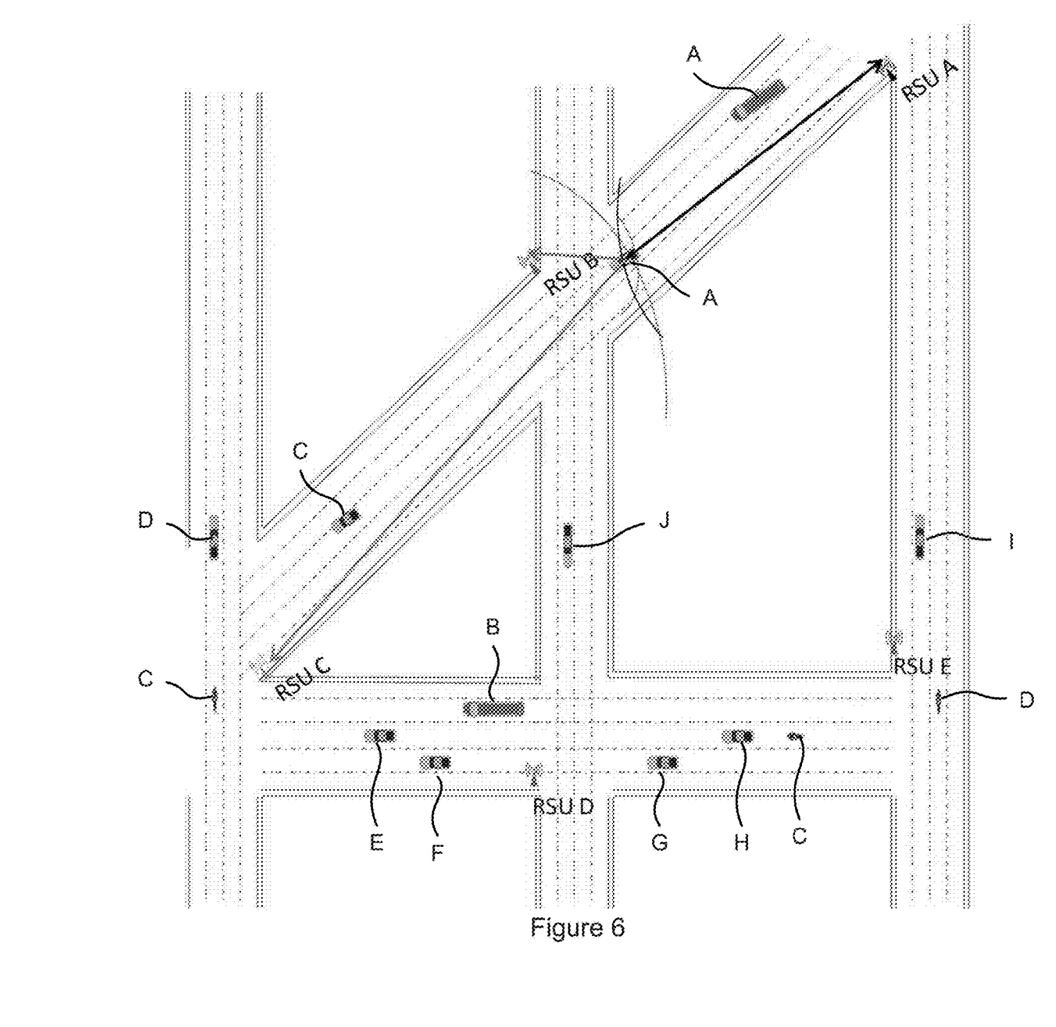

In some embodiments, the vehicles 11-14 may be equipped with a processor (as shown by reference numeral 12c for vehicle 12). In certain embodiments, the vehicles 11-14 may also be equipped with a position engine (11b-14b). A position engine is provided for receiving the range measurements, known location of the RSUs which are used to calculate the range measurements, and additional information for accurately calculating the position of the vehicle. The position engine may utilize any known position estimation solution, for example, hyperbolic positioning, multilateration such as trilateration (as shown in FIGS. 2, 5 and 6), Enhanced Kalman filter (EKF) or particle filter-based.

Although in FIG. 1, the position engines are illustrated as being installed in the vehicles, this may not be the case in all embodiments. Instead, in some embodiments, position engines may be positioned with infrastructure elements or the functionality of the position engine may be centrally/remotely located.

RSUs are typically deployed by road authorities or third parties (like parking garage operators, petrol stations etc.) at fixed locations, primarily to provide back-haul and/or locally managed services. These RSUs generally broadcast their position information in either: Wave Service Announcements (WSA) (IEEE 1609); or Geo-networking messages (ETSI ITS). Thus, the exact location of these RSUs is well known to any communication enabled vehicle which is present within the RSUs reception range.

The communication devices (i.e., the RSUs, OBUs, and/or mobile devices) described herein may be any suitable device that is capable of receiving communication messages from other objects and transmitting communication messages to other objects in the connected vehicle environment 10. For example, the communication device 11a attached to the vehicle 11 may be configured to allow vehicle-to-everything (V2X) and everything-to-vehicle (X2V) communication. As used herein, the definition of V2X communication or a V2X message includes vehicle-to-everything (V2X) communication and everything-to-vehicle (X2V) communication. In particular, a V2X communication or message can include any of the specific types of communications such as V2I (Vehicle-to-Infrastructure), V2V (Vehicle-to-vehicle), V2P (Vehicle-to-Pedestrian), V2D (Vehicle-to-device), V2G (Vehicle-to-grid), V2N (Vehicle-to-Network), I2V (Infrastructure-to-Vehicle), P2V (Pedestrian-to-Vehicle), D2V (Device-to-Vehicle), G2V (Grid-to-Vehicle), and N2V (Network-to-Vehicle) communication. Typically, OBUs 11a-14a include hardware and software elements such as transmitting or receiving antennas for transmitting and/or receiving signals, processing circuitry such as amplifiers, RF signals, processors, Analog-to-Digital Convertors, Digital-to-Analog Convertors etc. to process the incoming/outgoing signals.

V2X communication can be based on either Wi-Fi LAN technology (for example DSRC or ITS standards) and works directly between communication devices (when they are within each other's reception range) or cellular technology (for example 4G, or 5G etc.) which requires a mobile communication network between the communicating devices. In Wi-Fi based V2X communication, different types of communication channels or standards may be employed such as Dedicated Short Range Communications (DSRC), ETSI-ITS, IEEE 1609 or C-ITS. All of these standards rely on the Wi-Fi standard IEEE 802.11p as the underlying physical and medium access layer technology. IEEE 802.11p is a specific Wi-Fi mode operating in the 5.9 GHz frequency band.

In the connected vehicle environment 10 of FIG. 1, the position of the moving vehicle 11 can be determined using V2X communication. The on board unit (OBU) 11a of within its reception range. For example, device 11a may find RSU 15a within its reception range and start communicating with it using V2X communication to obtain range measurements (V2X communication is explained in details under sections "Unicast based ranging" and "Multicast based ranging"). The range measurements along with the known fixed location of RSU 15a can be utilized to estimate the position of vehicle 11.

Generally speaking, in V2X messaging standards, one or more communication channels are reserved as control channels for communicating safety messages and service announcements. The remaining spectrum channels may be used for non-safety related data traffic. One or more of these safety and/or service announcement messages may be utilized to determine range and subsequently calculate the absolute position of an object.

Examples of safety messages include basic safety messages (BSM), MAP (Mobile Application Part) messages, Signal Phase and Timing (SPaT) messages, common perception messages (CPM), and these messages typically include identification information about an object (e.g., describing what the object is—a lamp post, a traffic signal, a Mitsubishi Lancer, a 10 m long bus, etc.) and the known positional information of the object (e.g., GPS coordinates in WSG84 format of the object's current location). Furthermore, safety messages such as BSM messages may include other parameters associated with the objects such as current speed, and direction of motion (or heading). SPaT messages, on the other hand, describe the signal state of an intersection and how long this state persists for each approach and lane that is active. MAP messages describe the static physical geometry of one or more intersections, i.e., lane geometries and the allowable vehicle movements for each lane. In other words, MAP messages introduce the idea of "intersection data frame" which describes barriers, pedestrian walkways, shared roadways and/or rail lines that may affect vehicle movements. In certain embodiments, this message may further include complex intersection descriptions and can also describe curved approaches. The information provided by some safety messages (e.g., MAP messages) is usually static, whereas the information provided in other messages (e.g., BSM, and SPaT messages) can be dynamic.

In addition to information about the object itself, in certain embodiments, objects may also be configured to communicate information about other objects they can detect in their vicinity—i.e., they may be able to 'pass on' information about objects in their vicinity to other objects in their vicinity. This is helpful when for example not all pedestrians, cyclists or vehicles in a vehicle ecosystem are equipped with communication devices and/or perception sensors. In these cases, objects with perception sensors and communication devices can detect the 'non-connected' objects and provide information about these non-connected objects to other objects 11-16 in the vehicle ecosystem 10. In certain embodiments, this information may be transmitted using collective perception messages (CPM).

Service announcement messages are typically broadcast messages that are periodically transmitted by communication devices and often include information about the type of service(s) offered by a particular object/infrastructure element. Accordingly, these types of messages typically include identification of the object (e.g. what is the object, an RSU, a car or a truck), serial number of the object, what services the object can offer, and so on. In an embodiment, an RSU of a fixed infrastructure element (such as traffic lights) is equipped to periodically transmit service announcement messages. Any V2X equipped vehicle present within the RSU's reception range is able receive the RSU's service announcement messages and may start communicating with the RSU for one or more services provided by the RSU.

According to some aspects of the present disclosure, service announcement messages may be utilized to calculate the range (i.e., the distance) between an object/infrastructure element broadcasting the service announcement messages and an object/infrastructure element receiving the broadcasted messages. To do this, aspects of the present disclosure define a new type of service announcement message—a locate message—that includes information about the transmitting object/infrastructure element and indicates that the object/infrastructure element provides a ranging service. The format of this message is described in detail below.

In additional to these messages, aspects of the present disclosure also introduce a timing message that is utilized in some embodiments for ranging. The timing message typically includes temporal information related to the time of arrival and departure of one or more previous messages. Moreover, the timing message also includes control information and a unique identifier of the associated OBU or RSU.

FIG. 2 illustrates an example of estimating the position of a vehicle 20 using V2X communication between the vehicle and multiple RSUs (RUSE, RSU2, and RSU3). Vehicle 20 and the RSUs exchange communication messages from which the range measurements are obtained. The vehicle is shown as a rectangle 20 and the range measurements from the vehicle 20 to RSU1, RSU2 and RSU3 are illustrated as intersecting circles which are labelled as Range 1, Range 2 and Range 3, respectively. Each circle is centered on an individual RSU's known fixed location with radius equal to the range measurement. These range measurements from spatially separated RSUs and fixed locations of the RSUs are fed into a position engine forming part of the vehicle's OBU 20a to accurately calculate the position of vehicle 20. This position engine provides information at the facilities layer of the software stack of the vehicle's OBU 20a.

In the above example of FIG. 2, vehicle 20 is shown as ranging to (the term "ranging" refers to a vehicle establishing communication with an RSU for determining range (distance) between them) three different RSUs, however, range measurements obtained from only a single RSU (or two RSUs) is also sufficient to precisely estimate the position of vehicle 20. In this case, however, additional location, range or bearing-based information present within the communication messages or obtained from other sources also needs to be used to estimate the position.

The vehicle communication messages can either be unicast, multicast or broadcast to the surrounding communication devices available within the reception range.

Unicast Based Ranging

Figure 3:
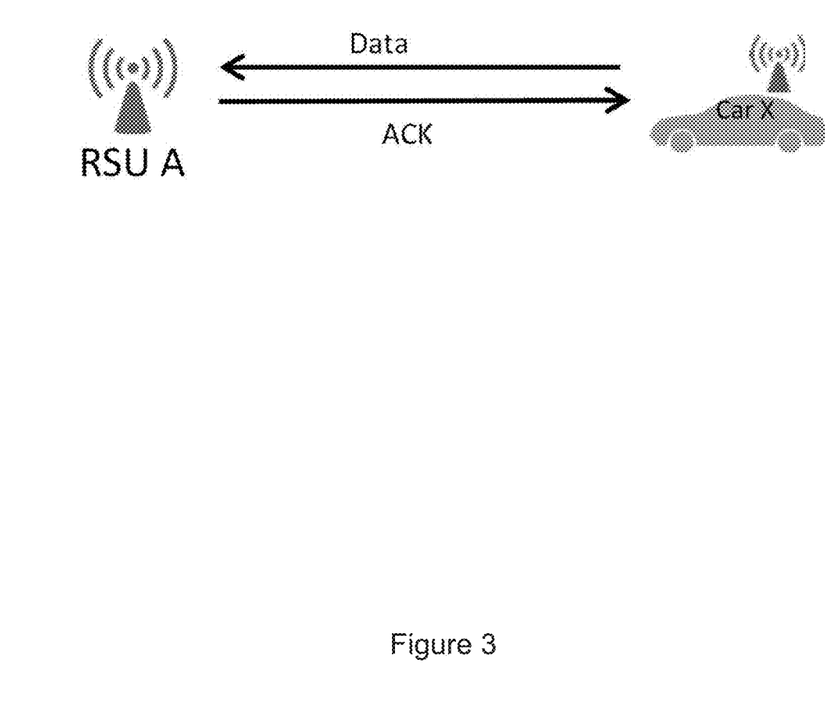
FIG. 3 illustrates a first embodiment of unicast based ranging.

FIG. 3 illustrates a first embodiment of the present disclosure in which the vehicle communication messages (i.e.

V2X messages) are transmitted in the form of unicast messages. In this method, a V2X message is transmitted from the OBU of Car X (having an indeterminate position) to the RSU A of an infrastructure element available within the OBU's reception range. Once the RSU receives the V2X message, it processes the message and generates an acknowledgement message which is transmitted back to the OBU of Car X. A processor (e.g. processor 12c as shown in FIG. 1) is provided with the OBU to calculate the time difference between the time at which a message was sent from the OBU to the RSU and the time at which the acknowledgement was received at the OBU. Knowing the fixed location of the RSU and calculated time difference, the processor can calculate the distance or range between the OBU and the RSU.

It will be appreciated that some delays (such as processing delays) may exist in this communication and these delays need to be accounted for when determining the range between the OBU and RSU. Processing delays are typically specific to a vendor (or the chip manufacturer) and can be measured. In certain embodiments, the RSU can advertise its characteristic response time delay in a service announcement message, such as the locate message. The characteristic response time delay of the RSU is specific to its hardware configuration and may depend on variations in the chip responsiveness, in cable lengths and so on. A measure of variance of the acknowledgement response delay (from a standard delay) can also be advertised in the locate service announcement message. By using these characteristic response time delay parameters, the OBU is able to compensate for extra processing delay on top of standard Short Interface Space (SIFS) time gaps (typically 16 or 32 microseconds). SIFS is the amount of time required for an OBU to process a received data packet and to respond with an ACK packet.

Once the range between car X and RSU A is calculated, this measurement along with the known location of RSU A is processed in the position engine to estimate the position of car X.

In an embodiment, the OBU of car X may establish unicast communication with more than one RSU located within the OBU's reception range for determining range measurements between car X and each of the RSU's. In this case, the OBU of car X will send independent unicast messages to each of the RSU's. The range information between car X and various RSU's, known locations of each of the RSU's and other related information can then be processed in the position engine to estimate the position of car X.

The main advantage of unicast ranging is that no clock offset (time offset between the car's clock and RSU's clock) or drift estimation is required as all the calculations are done in the local sender clock domain i.e. in the concerned OBU's time domain. A disadvantage is that for each unicast message only a single RSU can be targeted. Therefore, in order to communicate with multiple RSUs, independent unicast messages have to be transmitted to each of the multiple RSUs.

Broadcast/Multicast Based Ranging

Figure 4A:
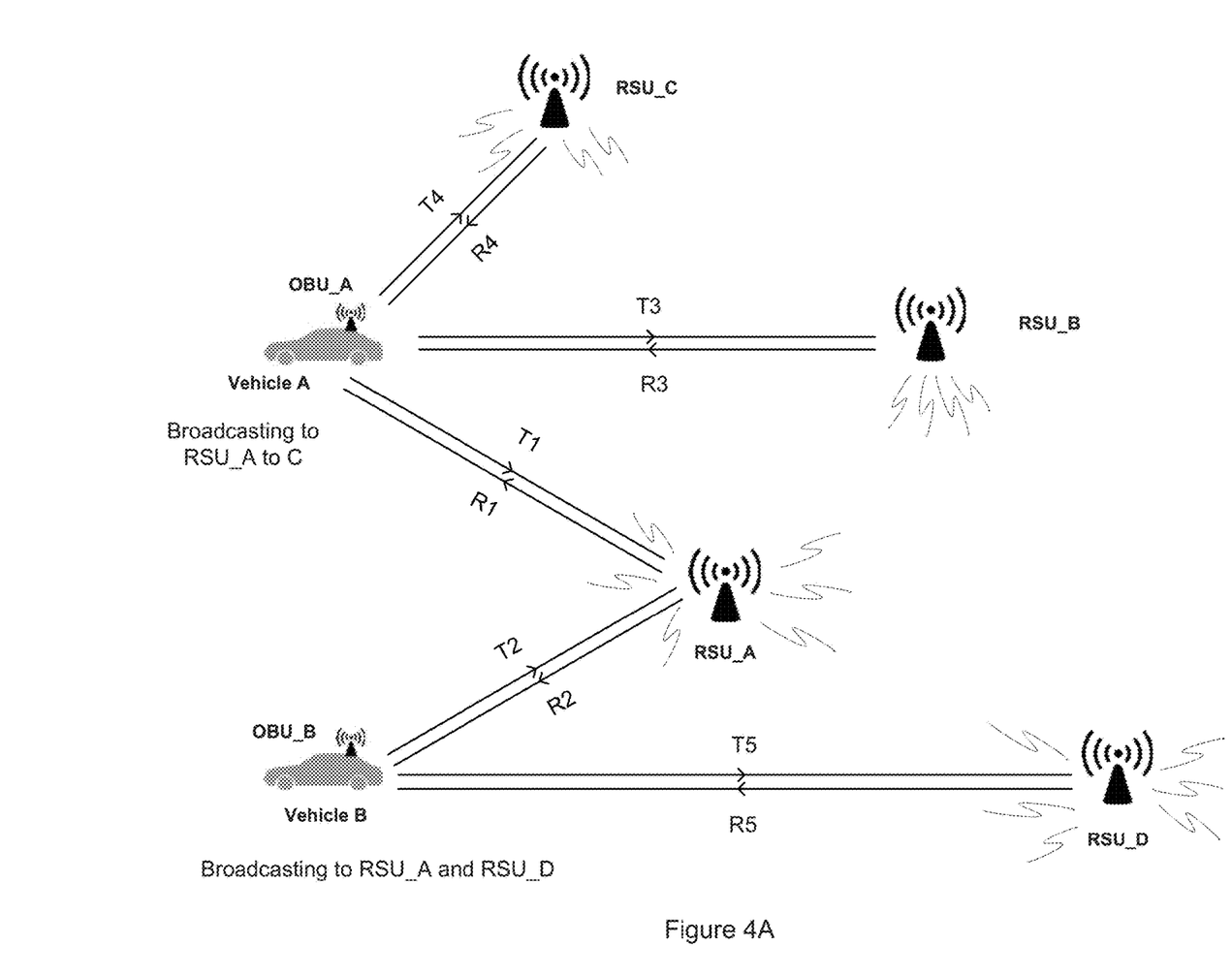
FIGS. 4A, 4B and 4C illustrate additional embodiments of multicast/broadcast based ranging.
Figure 4B:
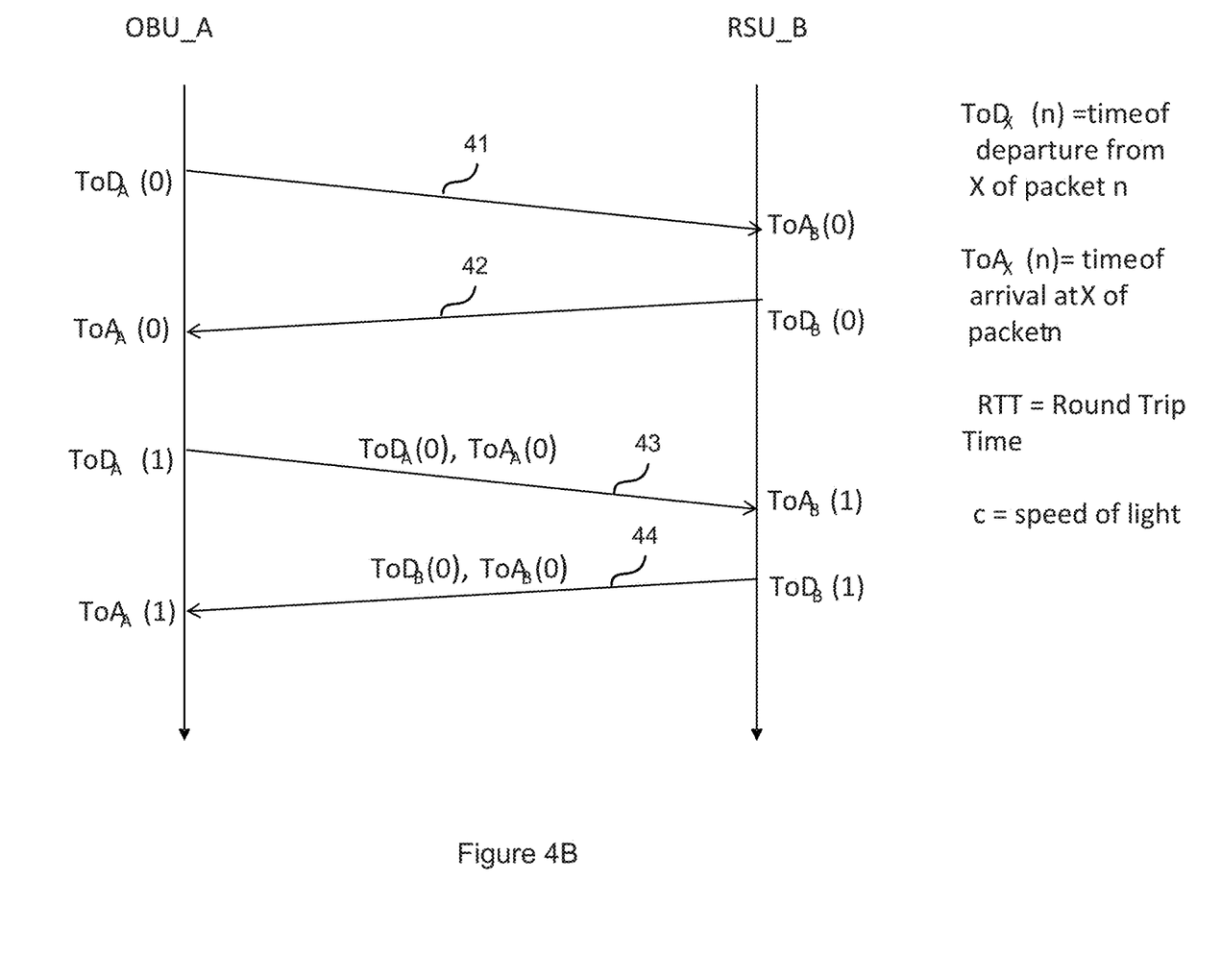

FIGS. 4(a) and 4(b) illustrate a second embodiment of the disclosure in which multicast/broadcast data packets (i.e. V2X messages) are used as communication messages for ranging. The key difference from the first embodiment shown in FIG. 3 is that the communication between vehicles and RSUs is not unicast, but multicast or broadcast in nature in which data packets are periodically transmitted and can be received by RSUs available within reception range. In an embodiment, the data packets are timing messages. This mechanism could be used for both IEEE 802.11p or LTE-V2X (C-V2X).

In this proposed mechanism, an RSU generally broadcasts its ranging service in the form of one or more locate service announcement messages. Objects equipped with communication devices within the RSU's reception range can listen to these locate messages and use these to calculate range to the RSU. In particular, an OBU of a vehicle (whose position is to be determined) located within the RSU's range receives a locate service announcement message from the RSU and determines if the RSU is providing a service for determining the vehicle's range (distance) from the RSU. Upon such determination, the OBU starts communication with the RSU. In particular, the OBU multicasts/broadcasts timing messages periodically. These timing messages can be received by RSUs present within the OBU's reception range. In response, the RSUs can generate timing messages and multicast/broadcast these messages.

The timing message may be in a digest format, e.g., including a unique object identifier (e.g., RSU's MAC address, or other temporary identifier of the RSU) followed by timestamps indicating the departure and arrival times for previous data packets. If the OBU's hardware knows the exact timing of departure for the current data packet, it can also send the departure time for the current packet within the timing message. The RSU broadcasts the timing information for all ranging OBUs in a digest format as well (e.g. OBU's MAC address or a unique identifier) followed by departure and arrival times of the previous data packet received at the RSU).

The clock's offset and drift between the interacting RSU and OBU needs to be tracked and removed for accurate time measurements. This is because even a 0.1 second periodic broadcast/multicast interval will cause significant time drift error between the clocks of interacting RSUs and OBUs. This can be slightly mitigated using a broadcast/multicast interval of 0.01 second from the data packets sent by the RSUs. The clock offset and drift could easily be estimated and removed using known methods such as linear estimation methods on the receiver side (OBU or RSU).

FIG. 4A shows an example broadcast/multicast scenario where two vehicles A and B and multiple RSUs A to D communicate with each other via multicast/broadcast timing messages to calculate ranges between the vehicles and the RSUs. In FIG. 4(a), vehicle A is shown to be in reception range and communicating with RSU_A, RSU_B and RSU_C whereas vehicle B is shown to be in reception range and communicating with RSU_A and RSU_D.

FIG. 4B shows a sequence of exchange of broadcast/multicast messages between OBU_A of vehicle A and RSU_B. In this figure, only a single range measurement is shown, derived from two packets n=0 and n=1. However the estimate can be improved by using averaging over multiple data packets.

In one example, range between a particular OBU (e.g., OBU_A) and an RSU (e.g., RSU_B) can be calculated as follows—

$$\text{Range}(n) = \text{RTT}(n) * c/2 \tag{1}$$

$$\text{RTT}(n) = (\text{ToA}_A(n) - \text{ToD}_A(n)) - (\alpha \times (\text{ToD}_B(n) - \text{ToA}_B(n))) \tag{2}$$

Where, $\text{ToD}_X(n)$=time of departure from X of packet n, $\text{ToA}_X(n)$=time of arrival at X of packet n, RTT=Round Trip Time, c=speed of light, and $\alpha$ is the clock drift between the OBU and RSU.

FIG. 4B shows an exchange of sequential n=0 and n=1 data packets between OBU_A and RSU_B. For the n=0 data packet, a first V2X message 41 is transmitted from OBU_A at time $ToD_A(0)$ which arrives at RSU_B at time $ToA_B(0)$. RSU_B then transmits a first V2X response message 42 at time $ToD_B(0)$ which is received at OBU_A at time $ToA_A(0)$. OBU_A keeps a log of time of departure of all the V2X messages from the OBU_A and time of arrival of all the V2X response messages at the OBU_A. Similarly, RSU_B keeps a log of time of arrival of all the V2X messages at RSU_B and time of departure of all the V2X response messages from RSU_B.

For the n=1 data packet, a second V2X message 43 is transmitted from OBU_A at time $ToD_A(1)$. The second V2X message 43 arrives at RSU_B at time $ToA_B(1)$. RSU_B then transmits a second V2X response message 44 at time $ToD_B(1)$ which is received at OBU_A at time $ToA_A(1)$. The second V2X response message 44 contains two time stamps $ToA_B(0)$ and $ToD_B(0)$ corresponding to the receipt and transmission times of the previous data packet n=0. Upon receiving the second V2X response message 44, the OBU_A can determine the round trip time RTT(0) and range Range (0) for data packet n=0 by using $ToD_A(0)$, $ToA_B(0)$, $ToD_B(0)$, $ToA_A(0)$ and α (see equations (1) and (2) in paragraph [0058] which are self-explanatory). The clock offset and drift "α" between the OBU_A and RSU_B can easily be determined using known methods such as linear estimation methods.

During the exchange of a following data packet n=2 (not shown in FIG. 4B), the OBU_A will receive a third V2X response message including time stamps $ToA_B(1)$ and $ToD_B(1)$ corresponding to the arrival and departure of second V2X message 43 from RSU_B and second V2X response message 44 at RSU_B, respectively. In that cycle (n=2), the OBU_A will determine the round trip time RTT(1) and Range(1) for the previous data packet n=1 by using $ToD_A(1)$, $ToA_B(1)$, $ToD_B(1)$, $ToA_A(1)$ and a.

As described above, in a current cycle corresponding to data packet "n", the OBU_A receives the time stamps $ToA_B(n-1)$ and $ToD_B(n-1)$ of the previous cycle corresponding to data packet "n−1". In other words, in a current cycle corresponding to data packet "n", the OBU_A determines the RTT(n−1) and Range(n−1) corresponding to the previous data packet "n−1".

The embodiments described in FIGS. 4A and 4B are directed to multicast/broadcast V2X messages sent by the object and V2X response messages from the RSUs where the V2X response messages transmitted from a particular unit comprises the temporal information (i.e. the times of receiving a previous V2X message at the RSU and transmitting a previous V2X response message from the RSU) related only to that particular unit. For example, as shown in FIG. 4A, the response message R1 transmitted by RSU_A to OBU_A comprises temporal information of RSU_A only. Similarly, other response V2X messages (R2, R3, R4 and R5) comprise temporal information of their corresponding unit (RSU_A, RSU_B, RSU_C, and RSU_D, respectively).

Figure 4C:
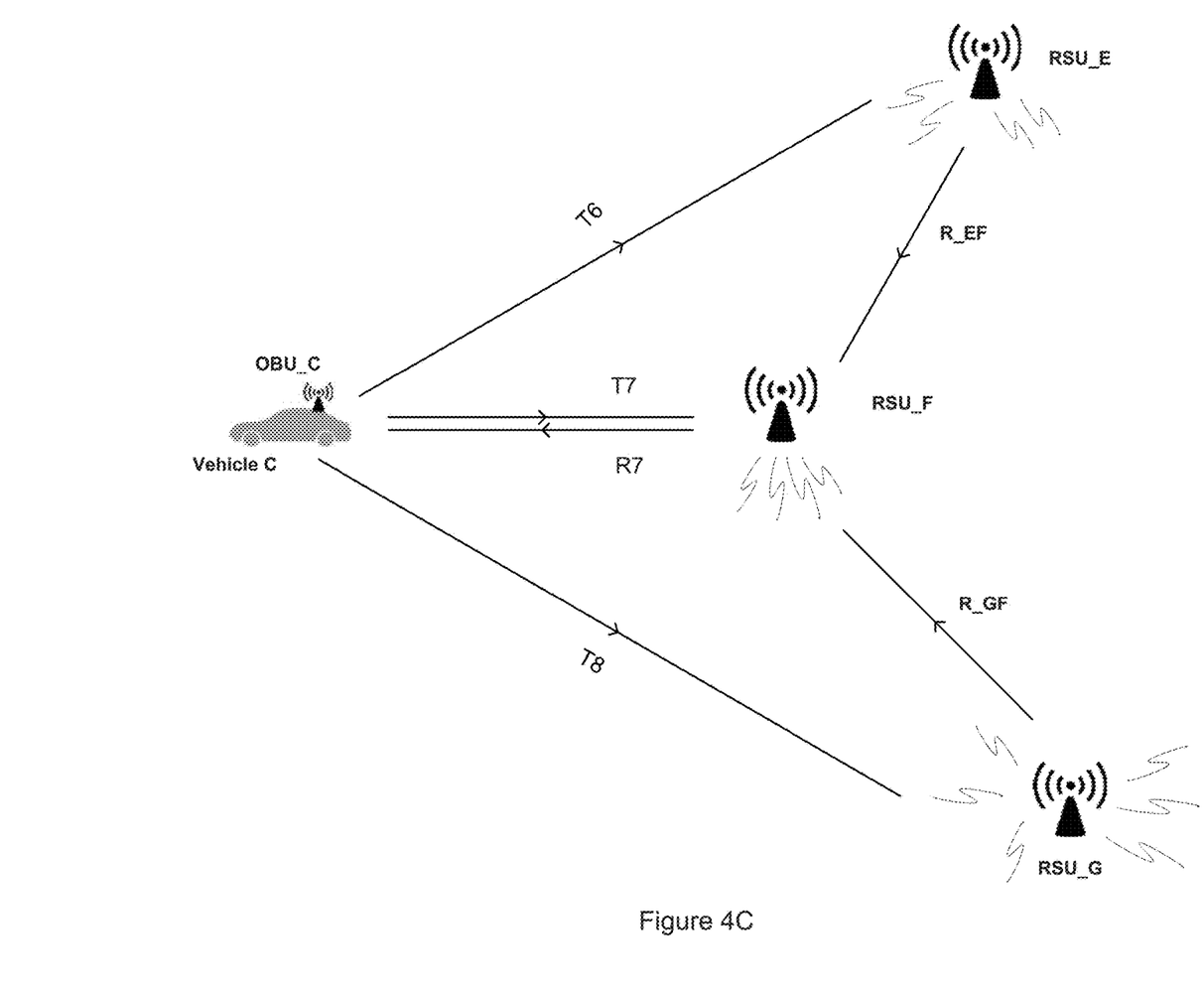

In an alternative embodiment, a set of V2X response messages can be transmitted as a single packet via a single RSU, which has received and combined response V2X messages from other RSUs. For example, as shown in FIG. 4C, an OBU_C of a vehicle C interacts with three units RSU_E, RSU_F and RSU_G within the OBU_C's reception range. At first, the OBU_C multicasts/broadcasts a packet (e.g. comprising a V2X message in the directions of T6, T7 and T8) to RSU_E, RSU_F and RSU_G. Upon receiving the V2X message, RSU_E and RSU_G can broadcast/multicast their corresponding V2X response messages R_EF and R_GF to the surrounding objects/units/infrastructure elements. RSU_F may receive the V2X response messages R_EF and R_GF, and combines the temporal information contained in these messages and its own temporal information into a single response packet R7. The single response packet R7 contains the temporal information of: a) the times of receiving a previous V2X message at the RSU_E and transmitting a previous V2X response message from the RSU_E; b) the times of receiving a previous V2X message at the RSU_F and transmitting a previous V2X response message from the RSU_F; and c) the times of receiving a previous V2X message at the RSU_G and transmitting a previous V2X response message from the RSU_G. RSU_F then broadcasts/multicasts R7 to the surrounding objects/units/infrastructure elements. In addition to the temporal information, the identity and positional information of each of the RSUs are included in the packet R7. It will be appreciated that RSUs E and G can also send response messages independently directly back to OBU in the manner previously described, in addition to the response messages relayed via packet R7. This may be used as a check/to increase accuracy of ranging using multiple range inputs.

Upon receiving the packet R7, OBU_C can estimate ranges between OBU_C and RSU_E, OBU_C and RSU_F, and OBU_C and RSU_G. These ranges can then be used to estimate the position of OBU_C.

The above described approaches of multicast/broadcast ranging are more scalable than the unicast ranging approach such as IEEE FTM. To give an example, IEEE has a maximum packet size of 2304 Bytes. A timing message contains 24 bytes per OBU (2 bytes for control, a 6 byte (48-bit) long unique identifier (e.g. MAC address), and two 8 byte (64-bit) long time-stamps). Therefore, 84 such communication messages in a digest format along with a valid certificate of 288 bytes can be placed in an IEEE 802.11p packet. Assuming rate 1/2 16 QAM frames, this should support 504 cars (OBUs) for less than 10% channel utilization per RSU (assuming 60 packets per second). The communication load from OBUs is generally much less in comparison to communication load from RSUs. This is because an OBU needs to send the communication messages to only a couple of RSUs at a time to obtain ranging and hence position estimation. It is important to note that a positioning engine based on differential ranging can be used as long as the RSUs are ranging to each other (e.g. using the methods above). In such a scenario, a differential positioning engine could be passively used by an OBU for locating its vehicle's position. In a similar way, a fully synchronized networked RSUs setup can be used to estimate the position of a vehicle just by the RSUs passively listening to the Basic Safety Message (BSM) or Cooperative Awareness Messages (CAM) and using differential times of arrival of these data packets across the RSU network to locate the vehicle's coordinates.

In an embodiment, the OBU may first register with the surrounding RSUs (which are advertising their ranging services) before they begin ranging. Generally speaking, in a vehicle ecosystem, it is possible for hackers or miscreants to install rogue communication devices that communicate incorrect service/identification information. Such incorrect information can be very detrimental when determining for example the position of a vehicle or autonomously driving the vehicle. Accordingly, objects in the vehicle ecosystem typically validate each other before relying on the information received from each other. In a typical registration process, objects (e.g. RSUs) transmit their unique identifiers, and receiving objects (e.g. vehicles) check whether these unique identifiers correspond with authentic communication devices or not based on valid certificates. If the registration/validation is successful, the objects begin communication with each other. Otherwise, any messages received from invalidated objects can be ignored.

In a further embodiment, the registration process is a simple and straightforward process that includes verifying the integrity of the service announcement messages received by the vehicle from the RSU's. For example, a vehicle, upon receiving a service announcement message from an RSU, verifies that the contents of the service announcement message are correct based on valid certificates. Upon such verification, the vehicle can commence exchanging V2X messages with the verified RSU's.

It will be appreciated that V2X messages (timing messages, locate service announcement messages, or acknowledgement messages) may suffer from multi-path extensions caused by urban canyons. Multi-path extensions are the multiple paths taken by V2X messages as they bounce off buildings and other infrastructural elements. These multi-path extensions may be processed for an accurate determination of range or distance between two objects. A detailed description of how to process multi-path extensions is provided in U.S. application Ser. No. 16/510,819 which is hereby incorporated by reference in its entirety.

Virtual Heading Sensor

In further embodiments, a virtual heading sensor can be used to obtain additional information which can be used together with the range measurements obtained using unicast or multi/broadcast for more precisely estimating the position of a vehicle. A road side unit (RSU) as the name implies is generally deployed along the side of the road, or at intersections, or roundabouts. RSUs are equipped with the information relating to the geometry of the road in the form of a MAP message. As described previously, MAP message can be used to derive the angles of the road (e.g. from absolute north). This information can be used for calculating a possible set of directions/angles (also known as direction or heading) of a vehicle. This information along with the range measurements can be used by the positioning engine of a vehicle to accurately estimate the vehicle's position.

The set of possible angles in the reception range of an RSU can also be advertised in the locate message. An RSU can also monitor the BSM or CAM messages from cars near its location to learn dominant angles on an intersection automatically. A BSM/CAM message generally comprises information relating to a car's speed, and direction of heading. This information can be used by an RSU to deduce road angles. For example, if a car is travelling due east at a speed of 60 km/h, the RSU can determine that an east-west road exists. Alternatively, if a car is travelling due north at a speed of 5 km/h, it may be difficult to deduce whether the car is travelling on a road, or is in a parking lot, for example.

FIGS. 5 and 6 show a typical use of V2X connected communication environment in a city layout for estimating position of moving/stationary vehicles. There are shown various vehicles, for example, cars A-I, buses A-B, motorbikes A-C and RSU's A-E. Car A (OBU_A) ranges to RSU A, B and C and the car's position engine fuses this information to estimate its position. The car's position engine may be any known position estimation solution, for example, hyperbolic positioning, multiliteration such as trilateration (as shown in FIGS. 2, 5 and 6), Enhanced Kalman filter (EKF) or particle filter could be used as the basis for a position engine.

Figure 7:
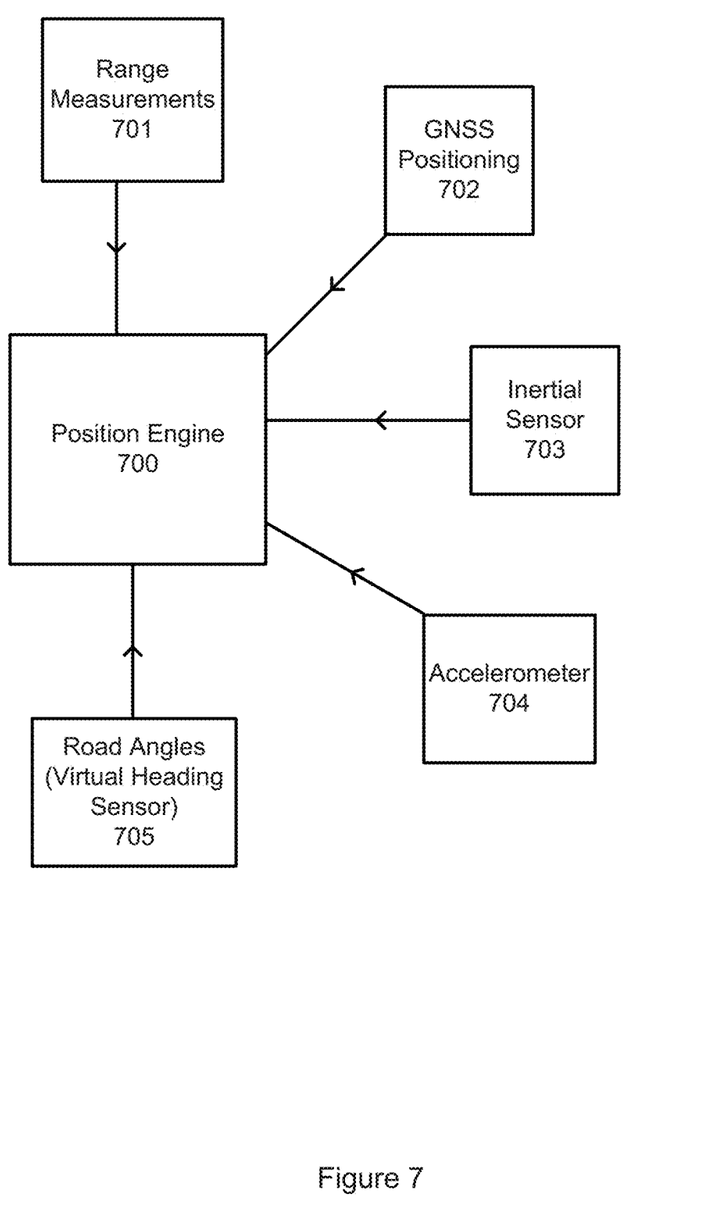
FIG. 7 shows a schematic diagram of a position engine use for estimating the position of a vehicle in accordance with the embodiments of the present disclosure.

The RSUs advertise the road angles in their V2X service advertisement messages, which may then be fused by Car A's position engine (position engine 700 as shown in FIG. 7). In the exemplary setup of FIG. 6, the road angles are 0, 45, 180 and 225 degrees from absolute North. These road angles can act as 'Virtual Heading Sensors' (VHS) to the position engine 700. A yaw rate sensor (i.e., a sensor for determining rate of change of yaw), if available, can also be used to guide the application of VHS into the position engine 700. For example, in one embodiment, the road angles can be applied to the position calculations if the yaw rate is constant (meaning yaw is changing at a constant rate, which may mean that the vehicle is not turning), by reinforcing the direction of heading which is closest to the solution. If the current direction of heading of the vehicle is represented by current_heading, then by picking the road angle which minimizes the metric [available_road_angle−current_heading] is the virtual_heading, where the road angles reported by the RSUs in their V2X service advertisement messages can be used to derive the available road angles. A simple threshold check can also be used to gain finer control. For example, if the [(Current_heading−Virtual_heading)<A Predetermined Threshold], then the virtual_heading can be fused into the position engine for estimating the position of the vehicle. This method can easily be extended for curved roads. Then simple check is if the curved shape profile of the yaw or yaw rate matches the road curvature by a certain margin.

FIG. 7 shows a position engine 700 that is used for estimating the position of a vehicle by fusing range measurements obtained using V2X communication between the vehicle and available RSUs, and additional information. In an embodiment, the additional information can be obtained from multiple sources such as road angles (information obtained from virtual heading sensors 705), GNSS position estimation 702, information from speed sensors, inertial sensors 703 (pitch, yaw, and roll), accelerometers 704, and so on. In certain embodiments, a robust positioning solution may also include information obtained from GNSS (when in a good state) for more precisely estimating the position of the vehicle.

The RSU's can constantly send the local road angle information in their V2X service advertisement messages; however, it is up to the OBU's position engine 700 to use that information for positional accuracy. One method to fuse the road angle information will be to select the RSU closest in Euclidian distance to the OBU and use the angles from that particular RSU for the virtual heading determination (available_road_angles) using the previously described method. Another method can be to use all angles from the two closest RSUs or a combination of RSUs.

In one embodiment, if two OBUs have been placed onto a vehicle (for example, on a long vehicle such as a train) then a virtual_heading can be derived as heading between the two OBUs and can be fused into the position engine as a virtual heading sensor.

V2X-Locate Service Announcement Message Contents

For inter-operability of a V2X communication-based method among different operators a standardized locate service message specification may be used. A V2X-Locate message can be used to identify an RSU as supporting ACK-Response ranging services, Fine Timing Measurement (FTM), Broadcast/Multicast Timing Measurement (BTM/MTM). This message is intentionally kept short in order to allow transmission within a 32-byte IEEE1609 provider service context field.

Typical message content is described in Table 1. The basic message is 12 bytes in length.

TABLE 1

V2X-Locate Service Announcement Message Format

| Field | Bytes | Description |
| --- | --- | --- |
| (IE) PSID | 1 | PSID |
| (IE) Length | 1 | N, number of bytes following the Length field, including the OUI. |
| (VSIE) OrganizationIdentifier | 3 | E.G. OUI |
| (CIE) ProtocolID | 1 | Protocol ID |
| V2X-LocateMode | 1 | Ranging Service Type, bit-field. Bit 0, Data-ACK Ranging supported. Bit 1, BTM based Ranging supported. Bit 2, MTM based Ranging supported. Bit 3, FTM based Ranging supported. Bits 4 . . . 7 = Reserved. |
| AckRespDelayAdjust | 2 | The site (and or vendor-specific) SIFS turn-around response time delay adjustment from the nominal (16 us or 32 us), in 0.1 nanosecond units. A signed 2's complement number. |
| AckRespDelayVariance | 2 | The inherent ACK response time variance of the advertising device, units. An unsigned 2's complement number. |
| NumberOfRoadAngles | 1 | Number (n) of road angles. |
| Road Angles | 2 × n | List of positioning service heading angles, unsigned 0.01 degree units. |

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

It will be understood that the embodiments disclosed and defined in this specification extends to all alternative combinations of two or more of the individual features mentioned or evident from the text or drawings. All of these different combinations constitute various alternative aspects of the embodiments.

We claim:

1. A method for estimating the position of an object, the method comprising:
receiving one or more service messages from a plurality of spaced apart units in the vicinity of the object, wherein at least one of the service messages includes road specific information including information related to angles of roads in the vicinity of the unit;
transmitting a first V2X message from the object to the plurality of spaced apart units;
receiving a set of V2X response messages from at least two units in response to the first V2X message, wherein each response message comprises an identifier of the object, an identifier of the unit from which the response message was sent, and temporal information associated with the times of receiving a previous V2X message at the unit and transmitting a previous V2X response message from the unit; and
estimating the position of the object based on:
the information contained in the set of V2X response messages,
the times of transmitting the previous V2X message from the object and receiving the previous set of V2X response messages at the object,
the information related to angles of roads in the vicinity of the unit, and
an estimation of a clock offset and drifts occurring between the clock of the object and the clocks of the units.

2. The method of claim 1, wherein prior to transmitting the first V2X message, at least some of the plurality of units located within the object's reception range register with the object.

3. The method of claim 2, wherein the object receives the service message from each of the plurality of units as part of the registration process.

4. The method of claim 3, wherein the service message further comprises a unique unit identifier and at least one of positional information of the unit and characteristic response time delay of the unit.

5. The method of claim 4, wherein the registration process further includes verifying authenticity of the unique unit identifier in the service message based on valid certificates.

6. The method of claim 3 wherein the service message is a locate service announcement message.

7. The method of claim 1, wherein the object is a stationary or moving vehicle fitted with an On Board Unit (OBU), and the units are Road Side Units (RSUs) whose position co-ordinates are precisely known at any given time.

8. The method of claim 1, wherein a response V2X message comprises a control header portion, a unit identifier portion such as an address, and two time stamps.

9. The method of claim 1, wherein the set of response V2X messages are transmitted as a single packet via a single unit, which has received and combined response V2X messages from other units.

10. The method of claim 1, wherein the method is performed using either IEEE 802.11p (Wi-Fi v2x technology) standard or LTE-V2X/C-V2X (cellular v2x technology) standard.

11. A system for estimating the position of an object, the system comprising:
a communication device, connected to the object, for:
receiving one or more service messages from a plurality of units, wherein at least one of the service messages includes road specific information including information related to angles of roads in the vicinity of the unit;
transmitting a first V2X message from the object to the plurality of spaced apart units; and
receiving a set of V2X response messages from at least two units in response to the first V2X message, wherein each response message comprises an identifier of the object, an identifier of the unit from which the response message was sent, and temporal information associated with the times of receiving a previous V2X message at the unit and transmitting a previous V2X response message from the unit; and a processor for estimating the position of the object by processing:
the information contained in the set of V2X response messages,
the times of transmitting the previous V2X message from the object, and receiving the previous set of V2X response messages at the object,
the information related to angles of roads in the vicinity of the unit, and
an estimation of a clock offset and drifts occurring between the clock of the object and the clocks of the units.

12. The system of claim 11, wherein the object receives the service message from each of the plurality of units as part of a registration process.

13. The system of claim 12, wherein the service message further comprises a unique unit identifier and at least one of positional information and characteristic response time delay of the unit.

14. The system of claim 13, wherein the registration process further includes verifying authenticity of the unique unit identifier in the service message based on valid certificates.

15. The system of claim 11, wherein the object is a stationary or moving vehicle fitted with an On Board Unit (OBU), and the units are Road Side Units (RSU) whose position co-ordinates are precisely known at any given time.

16. The system of claim 11, wherein a response V2X message comprises a control header portion, a unit identifier portion such as an address, and two time stamps.

17. The system of claim 11, wherein the set of response V2X messages are transmitted as a single packet via a single unit, which has received and combined response V2X messages relayed from other units.

18. A method for estimating the position of an object, the method comprising:
receiving one or more service messages from a plurality of spaced apart units in the vicinity of the object, wherein at least one of the service messages includes road specific information including information related to angles of roads in the vicinity of the unit;
transmitting a first V2X message from the object to the plurality of spaced apart units or transmitting a respective first V2X message from the object to each of at least one unit of the plurality of spaced apart units;
receiving V2X response messages from at least two units in response to the first V2X message or receiving a V2X response message from the at least one unit in response to the respective first V2X message, wherein each response message comprises an identifier of the object, and an identifier of the unit from which the response message was sent, and
estimating the position of the object based on:
the information contained in the V2X response messages or message,
the times of transmitting the first V2X message or messages from the object and receiving the V2X response messages or message at the object,
the information related to angles of roads in the vicinity of the unit, and
an estimation of a clock offset and drifts occurring between the clock of the object and the clocks of the units.

* * * * *